US009596463B2

(12) United States Patent  
Chong et al.

(10) Patent No.: US 9,596,463 B2  
(45) Date of Patent: Mar. 14, 2017

(54) CODING OF LOOP FILTER PARAMETERS USING A CODEBOOK IN VIDEO CODING

(71) Applicant: QUALCOMM Incorporated, San Diego, CA (US)

(72) Inventors: In Suk Chong, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 765 days.

(21) Appl. No.: 13/773,151

(22) Filed: Feb. 21, 2013

(65) Prior Publication Data

US 2013/0215974 A1    Aug. 22, 2013

Related U.S. Application Data

(60) Provisional application No. 61/601,994, filed on Feb. 22, 2012, provisional application No. 61/736,918, filed on Dec. 13, 2012.

(51) Int. Cl.
| | |
|---|---|
| *H04N 19/463* | (2014.01) |
| *H04N 19/40* | (2014.01) |
| *H04N 19/82* | (2014.01) |
| *H04N 19/91* | (2014.01) |

(52) U.S. Cl.
CPC ..... *H04N 19/00472* (2013.01); *H04N 19/463* (2014.11); *H04N 19/82* (2014.11); *H04N 19/91* (2014.11)

(58) Field of Classification Search
CPC ........ H04N 19/82; H04N 19/91; H04N 19/70; H04N 19/96
See application file for complete search history.

(56) References Cited

U.S. PATENT DOCUMENTS

| | | | |
|---|---|---|---|
| 8,121,418 B2 | 2/2012 | Ye et al. | |
| 2008/0013633 A1* | 1/2008 | Ye | H04N 19/13 375/240.24 |
| 2010/0329361 A1 | 12/2010 | Choi et al. | |
| 2011/0153699 A1 | 6/2011 | Reznik et al. | |
| 2011/0274158 A1 | 11/2011 | Fu et al. | |
| 2011/0305274 A1 | 12/2011 | Fu et al. | |
| 2012/0082244 A1 | 4/2012 | Chen et al. | |
| 2012/0177107 A1* | 7/2012 | Fu et al. | 375/240.03 |

(Continued)

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — Obafemi Sosanya  
(74) *Attorney, Agent, or Firm* — Shumaker & Sieffert, P.A.

(57) ABSTRACT

Techniques for coding video data include coding sample adaptive offset (SAO) offset values as part of performing a video coding process. In particular, the techniques include determining the SAO offset values according to a SAO process. The techniques further include storing a codebook defining a plurality of codes for coding different variations of SAO offset values. The techniques also include coding the SAO offset values in accordance with the codebook so as to specify the SAO offset values as one of the plurality of codes defined by the codebook.

50 Claims, 7 Drawing Sheets

(56) References Cited

U.S. PATENT DOCUMENTS

2013/0113880 A1* 5/2013 Zhao ............... H04N 19/70 348/43
2013/0182779 A1* 7/2013 Lim et al. ............ 375/240.29

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011,193 pp.
Bross et al., "WD4: Working Draft 4 of High-Efficiency Video Coding," 6th Meeting: JCTVC-F803_d2, Torino, IT, Jul. 14-22, 2011, 226 pp. 1.
Bross et al., "WD5: Working Draft 5 of High-Efficiency Video Coding," 7th Meeting: Geneva, Switzerland, Nov. 21-30, 2011, JCTVC-G1103_d2, 214 pp.
Bross et al., "High efficiency video coding (HEVC) text specification draft 6," 7th Meeting: Geneva, CH, Nov. 21-30, 2011, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Fu et al., "Sample Adaptive Offset for HEVC," 2011 IEEE 13th International Workshop on Multimedia Signal Processing, Oct. 2011, 5 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
International Preliminary Report on Patentability from International Application No. PCT/US2013/027327, dated Oct. 7, 2014, 8 pp.
International Search Report and Written Opinion from International Application No. PCT/US2013/027327, dated Feb. 26, 2014, 9 pp.
McCann et al., "HM4: High Efficient Video Coding (HEVC) Test Model 4 Encoder Description," JCT-VC Meeting; MPEG Meeting; Jul. 14-22, 2011,Torino, IT; (Joint Collaborative Team on Video Coding of ITU-T SG16 WP3 and ISO/IEC JTC1/SC29/WG11); URL: http://wftp3.itu.int/av-arch/jctvc-site/, No. JCTVC-F802, XP030009799, 36 pp.
ITU-T H.265, Series H: Audiovisual and Multimedia Systems, Infrastructure of audiovisual services_Coding of moving video, Advanced video coding for generic audiovisual services, The International Telecommunication Union. Oct. 2014, 540 pp.
Second Written Opinion from International Application No. PCT/US2013/027327, dated Aug. 18, 2014, 6 pp.
Laroche et al., "Non-CE1; On SAO fixed offsets," 9th Meeting; Apr. 27-May 7, 2012, JCT-VC Meeting; Geneva, CH (Joint Collaborative Team on Video Coding (JCT-VC) of ITU-T SG 16 WP 3 and ISO/IEC JTC 1/SC 29/WG 11) JCTVC-I0185, Apr. 26, 2012, 5 pp.
Huang et al., "Description of Core Experiment 1 (CE1); Sample adaptive offset filtering," Joint Collaborative Team on Video Coding (JCT-VC); 8th Meeting; San Jose, CA; Feb. 1-10, 2012; Document: JCTVC-H1101, Mar. 10, 2012, 10 pp.

* cited by examiner

CODING OF LOOP FILTER PARAMETERS USING A CODEBOOK IN VIDEO CODING

This application claims the benefit of U.S. Provisional Application No. 61/601,994, filed Feb. 22, 2012, and U.S. Provisional Application No. 61/736,918, filed Dec. 13, 2012, the entire contents of each of which are incorporated herein by reference.

TECHNICAL FIELD

This disclosure generally relates to video coding, and, more particularly, to coding of sample adaptive offset (SAO) offset values in a video coding process.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, the techniques of this disclosure relate to video coding. In particular, the techniques disclosed herein are directed to the coding of loop filtering parameters, including sample adaptive offset (SAO) offset values, used as part of a video coding process. As one example, the techniques of this disclosure include determining one or more SAO offset values according to an SAO process. In this example, the one or more SAO offset values may be determined as part of coding one or more blocks of video data. For example, the one or more SAO offset values may be determined for purposes of performing the SAO process in order to filter predictive data used to code the one or more blocks. The techniques further include storing a codebook that defines a plurality of sets of offset values that may be used to code different variations of SAO offset values at one or more of a video encoder and a video decoder. The techniques of this disclosure may also include coding the one or more SAO offset values determined in the manner described above in accordance with the codebook. Specifically, the techniques of this disclosure may include coding the one or more SAO offset values to specify the offset values as one of the plurality of sets defined by the codebook.

In one example of the disclosure, a method of decoding loop filter parameters in a video decoding process comprises receiving an indication indicating whether or not to use a codebook to perform a loop filtering process, wherein the codebook contains a plurality of entries, wherein each of the entries in the codebook comprises a set of loop filter parameters for the loop filtering process, and wherein the codebook is applicable for one or more blocks of video data, and performing the loop filtering process for the one or more blocks of video data based on the received indication.

The decoding method may further comprise receiving one or more syntax elements defining a particular entry in the codebook, retrieving the particular entry of loop filter parameters from the codebook based on the received one or more syntax elements, and performing the loop filtering process for the one or more blocks of video data based on the received indication and the retrieved loop filter parameters.

In one example, the loop filtering process is an adaptive loop filter ALF, and the loop filters parameters comprise ALF coefficients. In another example, the loop filtering process is a sample adaptive offset (SAO) filter, and the loop filter parameters comprise SAO offset values.

In another example of the disclosure, a method of encoding loop filter parameters in a video encoding process comprises determining a particular set of loop filter parameters for use in a loop filtering process, signaling an indication indicating whether or not the particular set of loop filter parameter are stored in a codebook, wherein the codebook contains a plurality of entries, wherein each of the entries in the codebook comprises a set of loop filter parameters for the loop filtering process, and wherein the codebook is applicable for one or more blocks of video data, and performing the loop filtering process for the one or more blocks of video data based on the particular set of loop filter parameters. The method may further comprise, signaling one or more syntax elements defining the entry for the particular set of loop filter parameters in the codebook.

The techniques of this disclosure will also be described in terms of an apparatus and a computer-readable medium. The techniques described in this disclosure may be implemented in hardware, software, firmware, or combinations thereof If implemented in hardware, an apparatus may be realized as an integrated circuit, a processor, discrete logic, or any combination thereof If implemented in software, the software may be executed in one or more processors, such as a microprocessor, application specific integrated circuit (ASIC), field programmable gate array (FPGA), or digital signal processor (DSP). The software that executes the techniques may be initially stored in a tangible computer-readable medium and loaded and executed in the processor.

As such, in another example, a computer-readable storage medium stores instructions that, when executed, cause one or more processors to code SAO offset values in a video coding process. In this example, the instructions cause the one or more processors to determine the SAO offset values according to a SAO process. The instructions further cause the one or more processors to store a codebook defining a plurality of codes for coding different variations of SAO offset values. The instructions also cause the one or more processors to code the SAO offset values in accordance with the codebook so as to specify the SAO offset values as one of the plurality of codes defined by the codebook.

The details of one or more examples are set forth in the accompanying drawings and the description below. Other features, objects, and advantages will be apparent from the description and drawings, and from the claims.

DETAILED DESCRIPTION

Figure 1:
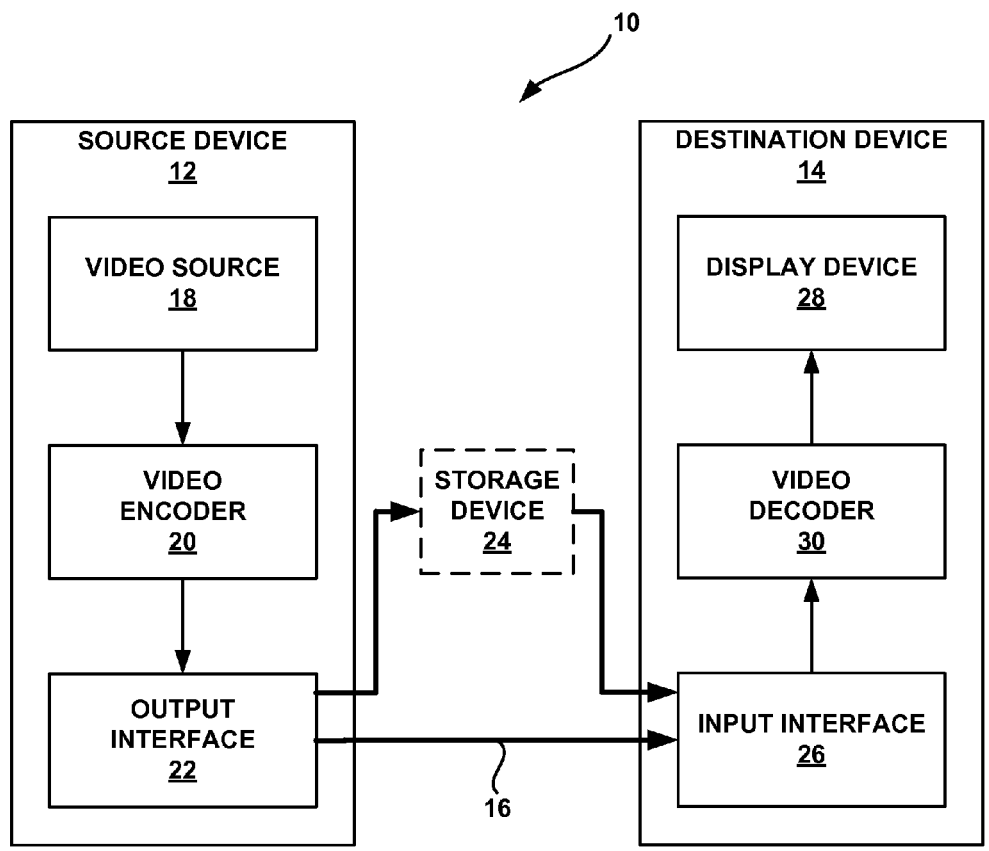
FIG. 1 is a block diagram that illustrates an example of a video encoding and decoding system that may perform techniques for coding sample adaptive offset (SAO) offset values in a video coding process, consistent with the techniques of this disclosure.

In general, the techniques of this disclosure relate to video coding. In some examples of the disclosure, the techniques disclosed herein are directed to the coding of loop filter parameters used as part of a video coding process. Example loop filtering processes may include processes performed by an adaptive loop filter (ALF), a sample adaptive offset (SAO) filter, a deblocking filter or another type of filter. This disclosure will focus the description on the coding of loop filter parameters (e.g., SAO offset values) for an SAO filter. However, the techniques described herein are equally applicable for coding ALF coefficients or other types of loop filter coefficients.

At the time of this disclosure, sample adaptive offset (SAO) coding is under consideration for adoption into the HEVC standard described above. In general, the addition of offset values to pixels in a video frame (e.g., a predictive frame for inter-prediction or intra-prediction) may improve coding during illumination changes between frames of a video sequence, e.g., such as during flashes, a darkening sky, or other types of illumination changes between frames. Such illumination changes may add a relatively uniform intensity change across the pixels in the frame. For example, offset values may be applied to pixels of a predicted video block in order to bias the values of the predictive video block so as to compensate for illumination changes.

SAO implementations in proposals for the HEVC standard include one or more potential drawbacks. For example, the encoding techniques currently specified in the HM and proposed in HEVC for encoding and decoding, respectively, the SAO offset type and the corresponding offset data may not be optimized to fully accommodate the distribution of SAO offset types and corresponding offset data. As such, this disclosure presents various techniques that may, in some cases, address one or more of the drawbacks identified above with respect to SAO coding as presently proposed in the HEVC standard. In particular, as one example, the specified and proposed entropy encoding and decoding techniques may be designed or possibly optimized for general distributions of these values. Through statistical evaluation of the SAO offset type and the corresponding offset data generally determined by an HM compliant video encoder, a number of relationships between offset values may be identified, which may form a basis for optimization of entropy encoding techniques that may more efficiently encode the SAO offset type and/or the corresponding offset data in comparison to the entropy encoding techniques specified by the HM and the entropy decoding techniques proposed by the HEVC.

The techniques proposed in this disclosure define a number of options with respect to encoding of the SAO offset type and the corresponding offset data (e.g., offset values). These optimizations may take advantage of the relationships between offset values identified through statistical evaluation of such values. To illustrate, the offset values have been determined through statistical evaluation to have a limited range of values. In other words, offset values are typically limited to a specific set of values. As one example, for an SAO edge offset type, the corresponding offset values have been identified to have what may be characterized as a "regular structure." This regular structure may be described as follows:

offset0 and offset3 are similar;
offset1 and offset2 are similar;
offset0/offset3 is bigger or equal to offset1/offset2; and
offset values are usually limited to 0/1/2.

The techniques described in this disclosure may exploit this regular structure to provide more efficient coding for SAO offset values in comparison to the independent coding of offset values as currently specified in the HM. In particular, the present disclosure proposes to use a codebook that contains indexed sets of SAO offset values that may be used for SAO processing in both a video encoder and a decoder.

As one example, the techniques include determining one or more SAO offset values according to a SAO process. In this example, the one or more SAO offset values may be determined as part of coding one or more blocks of video data. For example, the one or more SAO offset values may be determined for purposes of performing the SAO process in order to generate predictive data used to code the one or more blocks. The techniques further include storing a codebook that defines a plurality of sets of SAO offset values that may be used to code different variations of SAO offset values at one or more of a video encoder and a video decoder. The techniques also include coding the one or more SAO offset values determined in the manner described above in accordance with the codebook. Specifically, the techniques include coding the one or more SAO offset values to specify the offset values as one of the plurality of sets defined by the codebook. As a result, the disclosed techniques may enable coding the one or more SAO offset values more efficiently by using the single code defined by the codebook to code the offset values, rather than by directly coding each of the offset values.

As another example, the techniques disclosed herein may further include storing the codebook described above such that the codes of the plurality of codes defined by the codebook are optimized to exploit various relationships between the one or more SAO offset values. As a result, each of the plurality of codes defined by the codebook may be represented using less information (e.g., fewer bits of data) than the one or more SAO offset values. In this manner, the techniques may once again enable coding the one or more SAO offset values more efficiently by using the single code defined by the codebook to code the offset values, compared to directly coding each of the offset values.

Accordingly, the techniques of this disclosure may enable coding the one or more SAO offset values using less information (e.g., fewer bits of data) compared to other techniques used to code similar data. In particular, by enabling coding the one or more SAO offset values using the code defined by the codebook, the disclosed techniques may reduce the number of bits signaled in a bitstream relative to techniques that include directly coding the offset values.

Additionally, the above-described techniques may also reduce the complexity of a video coder used to code the one or more SAO offset values by potentially simplifying processing and/or storage resources of the video coder, or by reducing the usage thereof. Specifically, the techniques may enable the video coder to process and/or store less information than when coding the offset values directly, particularly in instances where the code defined by the codebook and used to code the offset values is represented using less information than the offset values themselves.

In this manner, there may be a relative reduction in complexity of a coding system used to code video data, and/or a relative bit savings for a coded bitstream that includes the coded video data, when using the techniques of this disclosure.

FIG. 1 is a block diagram that illustrates an example of a video encoding and decoding system that may perform techniques for coding SAO offset values in a video coding process, consistent with the techniques of this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 24. Similarly, encoded data may be accessed from storage device 24 by input interface 26. Storage device 24 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 24 may correspond to a file server or another intermediate storage device that may hold the encoded video generated by source device 12. Destination device 14 may access stored video data from storage device 24 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 24 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 24 for later access by destination device 14 or other devices, for decoding and/or playback.

Destination device 14 includes an input interface 26, a video decoder 30, and a display device 28. In some cases, input interface 26 may include a receiver and/or a modem. Input interface 26 of destination device 14 receives the encoded video data over link 16 or from storage device 24. The encoded video data communicated over link 16, or provided on storage device 24, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

Display device 28 may be integrated with, or be external to, destination device 14. In some examples, destination device 14 may include an integrated display device and also be configured to interface with an external display device. In other examples, destination device 14 may be a display device. In general, display device 28 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development by the Joint Collaborative Team on Video Coding (JCT-VC) of ITU-T Video Coding Experts Group (VCEG) and ISO/IEC Motion Picture Experts Group (MPEG), and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263. A recent draft of the HEVC standard, referred to as "HEVC Working Draft 8" or "WD8," is described in document JCTVC-J1003_d7, Bross et al., "High efficiency video coding (HEVC) text specification draft 8," Joint Collaborative Team on Video Coding (JCT-VC) of ITU-T SG16 WP3 and ISO/IEC JTC1/SC29/WG11, 10th Meeting: Stockholm, SE, 11-20 Jul. 2012, which, as of Feb. 18, 2013, is downloadable from http://phenix.int-evry.fr/jct/doc_end_user/documents/10_Stockholm/wg11/JCTVC-J1003-v8.zip. WD8 is incorporated by reference herein.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder ("CODEC") in a respective device.

The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-four intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more Pus and one or more TUs. Syntax data associated with a CU may describe, for example, partitioning of the CU into one or more Pus. Partitioning modes may differ between whether the CU is skip or direct mode encoded, intra-prediction mode encoded, or inter-prediction mode encoded. Pus may be partitioned to be non-square in shape. Syntax data associated with a CU may also describe, for example, partitioning of the CU into one or more TUs according to a quadtree. A TU can be square or non-square in shape.

Proposals for the HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as TUs. Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more TUs. Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block," or simply "block," to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scanning, or "scan" order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding, or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether or not neighboring values of the symbol are zero-valued.

Figure 2:
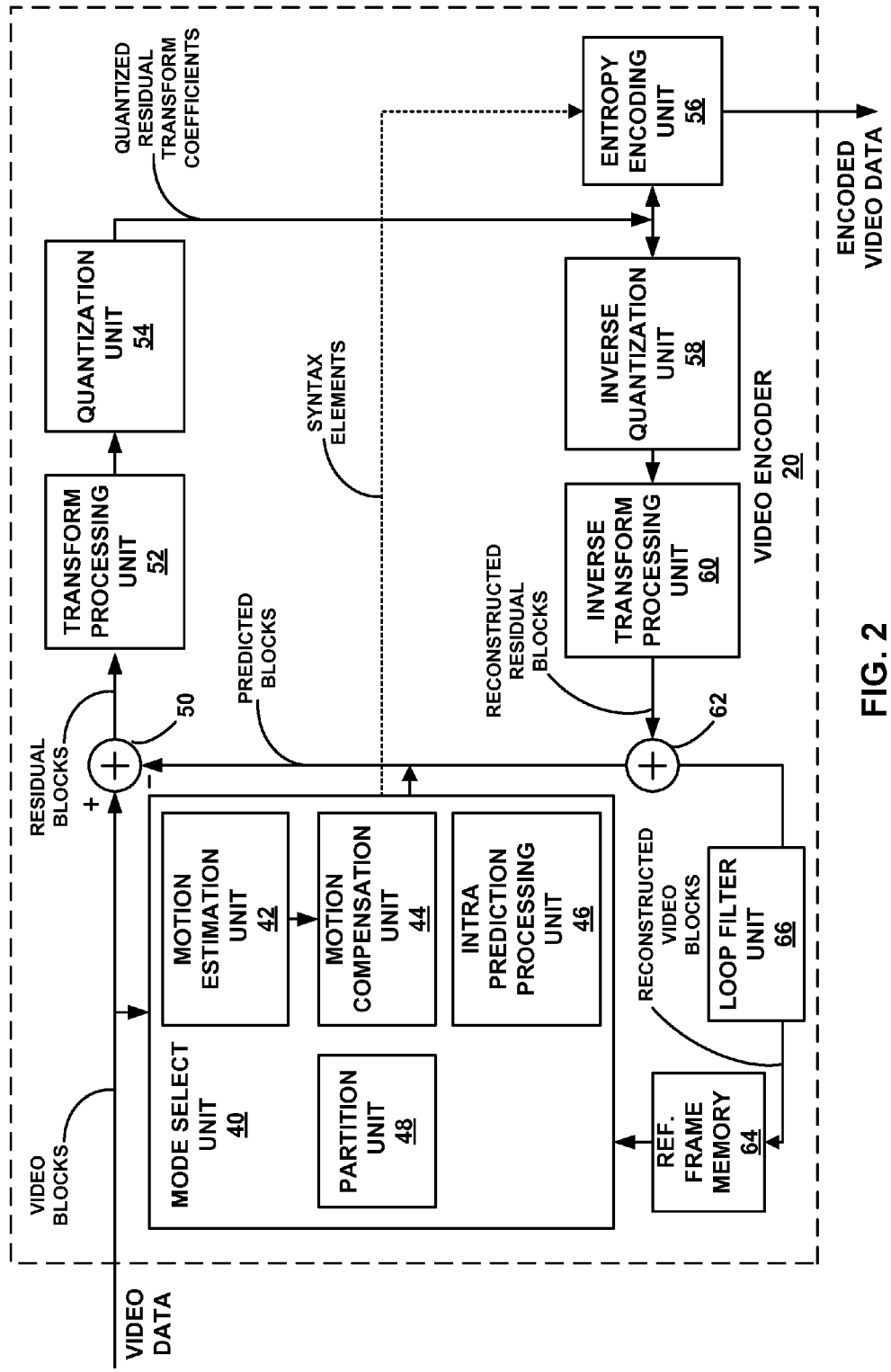
FIG. 2 is a block diagram that illustrates an example of a video encoder that may perform the techniques for coding SAO offset values in a video coding process, consistent with the techniques of this disclosure.
Figure 3:
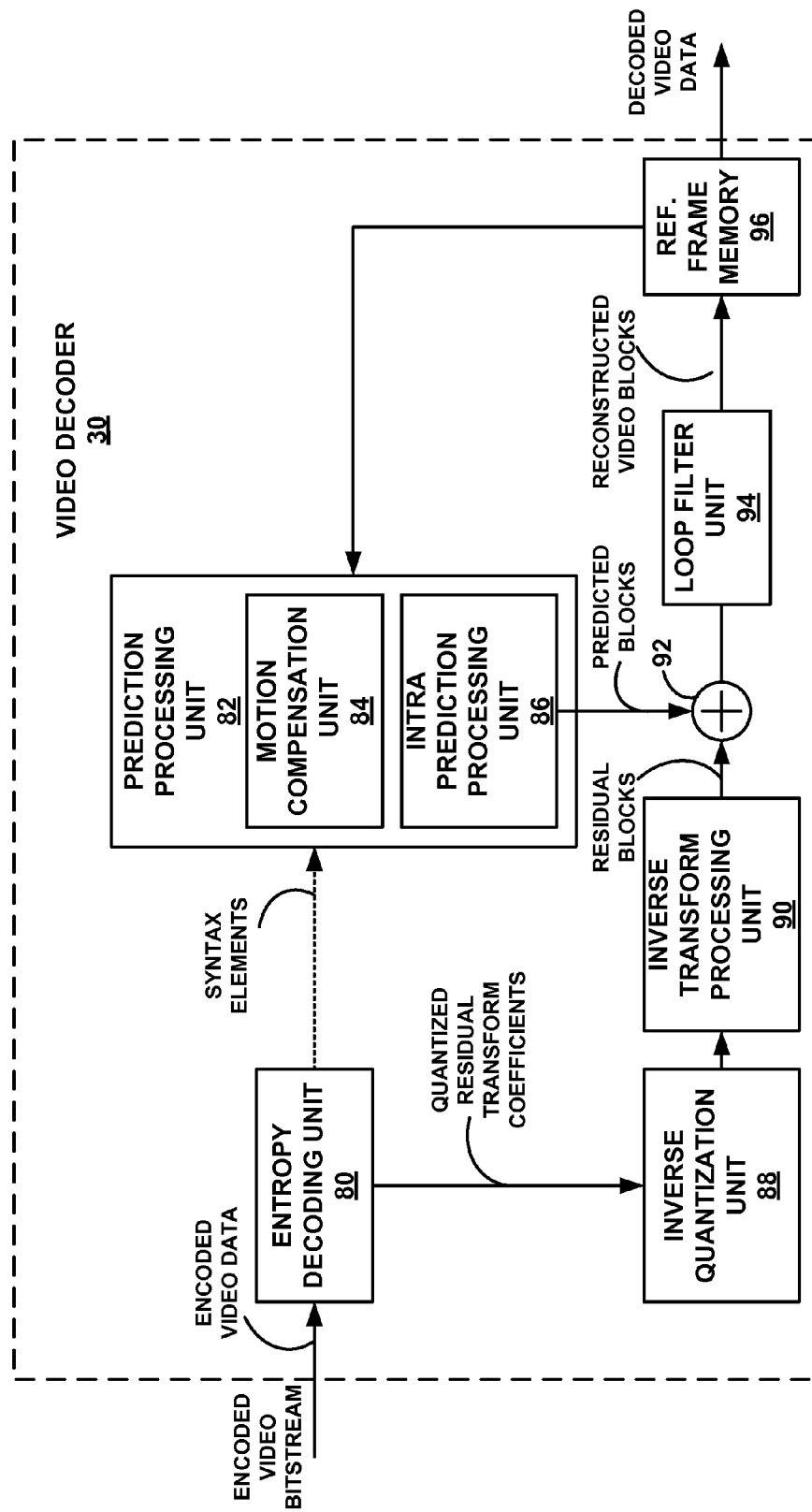
FIG. 3 is a block diagram that illustrates an example of a video decoder that may perform the techniques for coding SAO offset values in a video coding process, consistent with the techniques of this disclosure.

The following is discussed with reference to video encoder 20 and video decoder 30, as well as various components thereof, as depicted in FIGS. 2 and 3, and as described in greater detail below. At the time of this disclosure, sample adaptive offset (SAO) coding is under consideration for adoption into the HEVC standard described above. In general, the addition of offset values to pixels in a video frame (e.g., a predictive frame for inter-prediction or intra-prediction) may improve video quality and may provide for a smoothing effect.

Previous video coding standards, such as, e.g., H.264/AVC, applied offset types and values uniformly across entire blocks or frames of pixels. In contrast to these previous techniques, SAO techniques allow for different offset values to be applied to different pixels (or blocks) depending on pixel (or block) classification metrics. Possible classification metrics include activity metrics, such as edge metrics and band metrics. A description of offset classifications can be found in C.-M. Fu, C.-Y. Chen, C.-Y. Tsai, Y.-W. Huang, S. Lei, "CE13: Sample Adaptive Offset with LCU-Independent Decoding," JCT-VC Contribution, E049, Geneva, February 2011, which is incorporated by reference herein.

In the current SAO implementation according to proposals to the HEVC standard, each partition (which consists of a set of LCUs) can have one of three offset types (also called "pixel classification"): (1) no offset, (2) band classification based offset type 0/1, or (3) edge classification based offset type 0/1/2/3. Each band classification offset type has 16 possible offset values, while each edge classification based offset type has 4 possible offset values. If one of these offset types is chosen to be used for the partition, information indicating the corresponding offset type and the offset values (also called SAO coefficients) are sent to a decoder.

Figure 4:
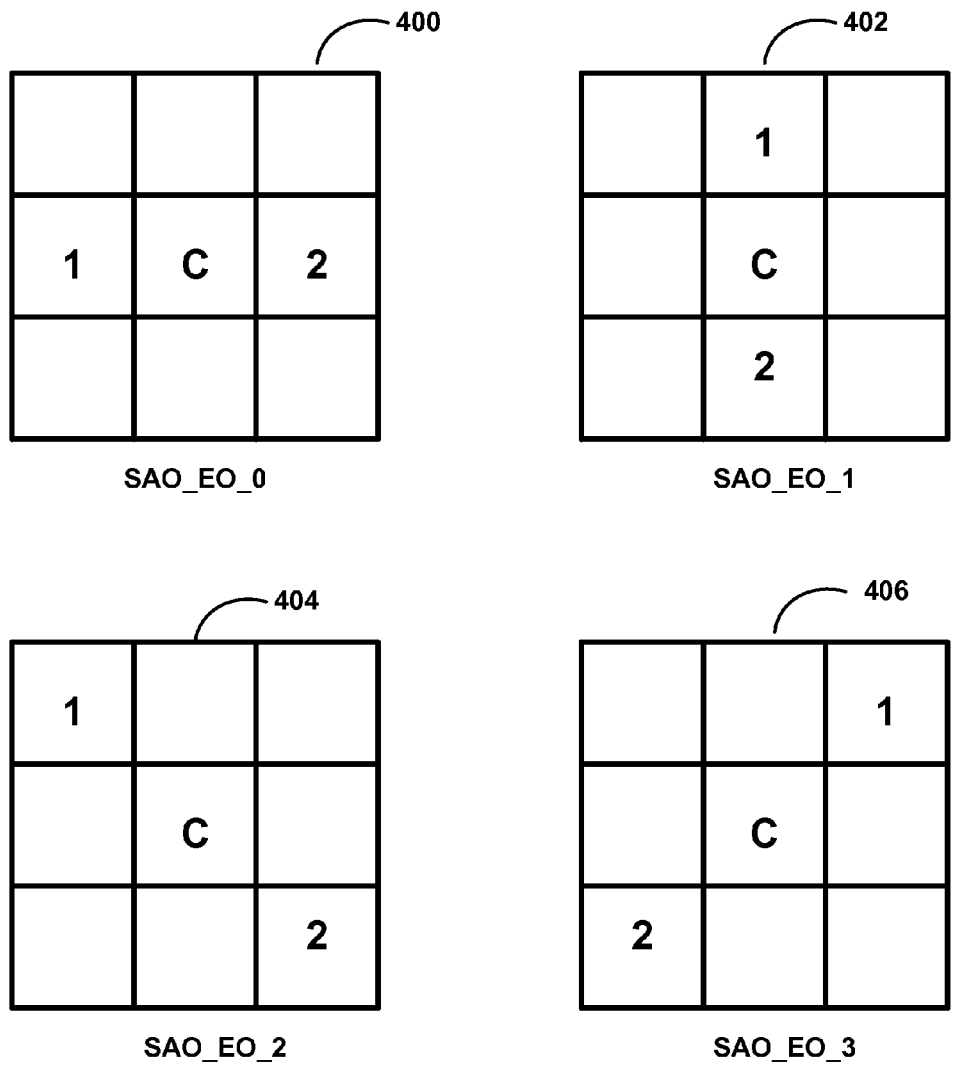
FIG. 4 is a conceptual diagram that illustrates examples of values of pixels of blocks of video data that may be used to perform edge classification in a SAO process, consistent with the techniques of this disclosure.

The edge offset type classifies each pixel based on edge information. FIG. 4 is a conceptual diagram that shows four possible edge offset classifications currently proposed for the HEVC standard. For each of the edge classifications shown in FIG. 4, an edge type for a current pixel is calculated by comparing a value of the current pixel ("C") to values of neighboring pixels ("1" and "2"). Specifically, pixels of block 400 correspond to SAO edge offset of classification zero, or "SAO_EO_0," pixels of block 402 correspond to SAO edge offset of classification one, or "SAO_EO_1," pixels of block 404 correspond to SAO edge offset of classification two, or "SAO_EO_2," and pixels of block 406 correspond to SAO edge offset of classification three, or "SAO_EO_3."

In the above-described SAO techniques according to the HEVC standard, initially, the edge type of the current pixel is assumed to be zero. Furthermore, if the value of the current pixel C is equal to the values of both of the left and the right neighbor pixels 1 and 2, the edge type remains zero. If, however, the value of the current pixel C is greater than the value of the neighbor pixel 1, the edge type is increased by one. Alternatively, if the value of the current pixel C is less than the value of the neighbor pixel 1, the edge type is decreased by one. Similarly, if the value of the current pixel C is greater than the value of the neighbor pixel 2, the edge type is increased by one, and if the value of the current pixel C is less than the value of the neighbor pixel 2, the edge type is decreased by 1.

As such, the current pixel C may have an edge type of either "−2," "−1," "0," "1," or "2." For example, the edge type is −2 if the value of the current pixel C is less than both of the values of the neighbor pixels 1 and 2. Furthermore, the edge type is −1 if the value of the current pixel C is less than the value of one neighbor pixel (e.g., 1), but equal to the value of the other neighbor pixel (e.g., 2). Additionally, the edge type is 0 if the value of the current pixel C is the same as the values of both of the neighbor pixels 1 and 2, or if the value of the current pixel C is greater than the value of one neighbor pixel (e.g., 1), but less than the value of the other neighbor pixel (e.g., 2). Also, the edge type is 1 if the value of the current pixel C is greater than the value of one neighbor pixel (e.g., 1), but equal to the value of the other neighbor pixel (e.g., 1). Finally, the edge type is 2 if the value of the current pixel C is greater than both of the values of the neighbor pixels 1 and 2. For each non-zero edge type value, four offset values (i.e., $eoffset_{-2}$, $eoffset_{-1}$, $eoffset_1$, $eoffset_2$) are determined and signaled (e.g., by video encoder 20) in an encoded video bitstream for use by a decoder (e.g., video decoder 30). The offset values for SAO may also be referred to as SAO coefficients.

Figure 5:
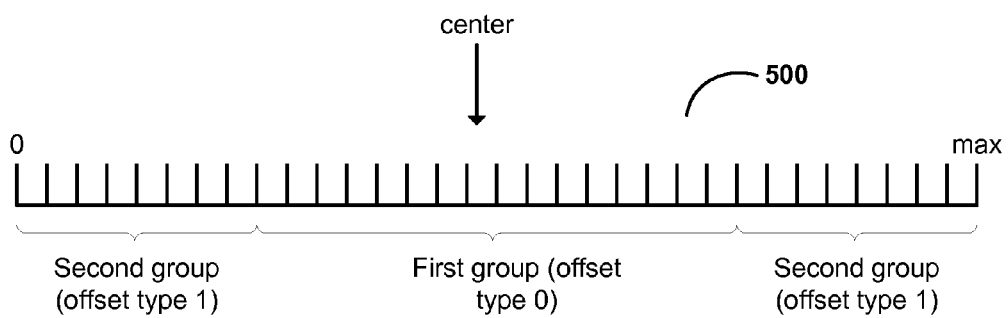
FIG. 5 is a conceptual diagram that illustrates examples of bands of pixels of blocks of video data that may be used to perform band classification in a SAO process, consistent with the techniques of this disclosure.

In view of the description provided above, for each edge offset classification, edge type values may be computed using the following expressions:

EdgeType=0;

if($C$>Pixel 1)EdgeType=EdgeType+1;

if($C$<Pixel 1)EdgeType=EdgeType −1;

if($C$>Pixel 2)EdgeType=EdgeType +1;

if($C$<Pixel 2)EdgeType=EdgeType −1;

For band offset, pixels are classified into different bands based on intensity. FIG. 5 is a conceptual diagram that illustrates examples of bands of pixels of blocks of video data that may be used to perform band classification in a SAO process, consistent with the techniques of this disclosure. Specifically, as shown in the diagram 500 of FIG. 5, bands of pixels of a block of video data may be determined based on pixel intensity values. In band offset classification, pixels are categorized into 32 bands, where 16 bands in the center are classified into one group, and the remaining bands are classified into a second group. For each group of bands, 16 offset values (i.e., $boffset_0$, . . . , $boffset_{15}$) may be determined and signaled by video encoder 20 in an encoded video bitstream for use by video decoder 30.

According to the HM, after a video encoder determines the SAO offset type (e.g., "off," meaning that no SAO offset is applied, "edge" offset type 0/1/2/3, or "band" offset), and the corresponding SAO offset values for each LCU, the video encoder encodes the offset type and the corresponding offset values in the encoded video bitstream for use by a video decoder. For example, the SAO offset type and the corresponding offset values may be signaled in slice data, a slice header, an adaptation parameter set (APS), a sequence parameter set (SPS), or a picture parameter set (PPS) in a bitstream. Additionally, the offset type and the corresponding offset values may be entropy encoded using any form of statistical lossless coding techniques so as to more efficiently communicate the offset type and the corresponding offset data to the video decoder in the bitstream.

The techniques described above with reference to SAO implementations in proposals for the HEVC standard include one or more potential drawbacks. For example, the encoding techniques currently specified in the HM and proposed in HEVC for encoding and decoding, respectively, the SAO offset type and the corresponding offset data may not be optimized to fully accommodate the distribution of SAO offset types and corresponding offset data. As such, this disclosure presents various techniques that may, in some cases, address one or more of the drawbacks identified above with respect to SAO coding as presently proposed in the HEVC standard. In particular, as one example, the specified and proposed entropy encoding and decoding techniques may be optimized for general distributions of these values. Through statistical evaluation of the SAO offset type and the corresponding offset data generally determined by an HM compliant video encoder, a number of relationships between offset values may be identified, which may form a basis for optimization of entropy encoding techniques that may more efficiently encode the SAO offset type and/or the corresponding offset data in comparison to the entropy encoding techniques specified by the HM and the entropy decoding techniques proposed by the HEVC.

The techniques proposed in this disclosure define a number of options with respect to improving entropy encoding of the SAO offset type and the corresponding offset data (e.g., offset values). These improvements may take advantage of the relationships between offset values identified through statistical evaluation of such values. To illustrate, the offset values have been determined through statistical evaluation to have a limited range of values. In other words, offset values are typically limited to a specific set of values. As one example, for an SAO edge offset type, the corresponding offset values have been identified to have what may be characterized as a "regular structure." This regular structure may be described as follows:

offset0 and offset3 are similar;

offset1 and offset2 are similar;

offset0/offset3 is bigger or equal to offset1/offset2; and offset values are usually limited to 0/1/2.

The techniques described in this disclosure may exploit this regular structure to provide more efficient coding for SAO offset values in comparison to the independent coding of offset values as currently specified in the HM. In particular, the present disclosure proposes to use a codebook that contains indexed sets of SAO offset values that may be used for SAO processing in both a video encoder and a decoder.

In operation, the techniques described in this disclosure may code SAO offset values in a video coding process. As one example, video encoder 20 may be configured to implement the techniques described in this disclosure to determine SAO offset values according to the SAO process described herein and to code the SAO offset values according to a statistical lossless coding process that has been optimized to exploit relationships between the SAO offset values to generate encoded SAO offset values. Likewise, video decoder 30 may be configured to implement the techniques described in this disclosure to determine SAO offset values in accordance with the SAO signaling and parsing techniques described herein.

In one example, video encoder 20 may code the SAO offset values by storing a codebook for the SAO offset values defining a plurality of codes for coding different sets of SAO offset values. Video encoder 20 may signal a bit in a bitstream to indicate that the codebook has been used to code the SAO offset values and signal an index to the codebook to indicate a specific set of SAO offset values that has been used. The codebook may be predefined and stored at both video encoder 20 and video decoder 30. In one example, the codebook may be a lookup table (LUT) that is stored in a memory at video encoder 20 and/or video decoder 30.

In other examples, rather than store a pre-defined codebook, video encoder 20 may adaptively determine the SAO offset values to be stored in the codebook and signal the adaptively determined codebook in one or more of a slice header, an adaptation parameter set (APS), a sequence parameter set (SPS) and a picture parameter set (PPS). Video encoder 20, in some instances, may signal the adaptively determined codebook in one or more of slice data, the slice header, the APS, the SPS and the PPS such that the adaptively determined codebook replaces any other codebook previously signaled or stored at video decoder 30. Alternatively, the video encoder, may in some examples, signal the adaptively determined codebook in one or more of slice data, the slice header, the APS, the SPS and the PPS such that the adaptively determined codebook augments any other previously signaled or stored codebook at video decoder 30 used to decode the encoded SAO offset values.

In other examples, video encoder 20 may code the SAO offset values according to a statistical lossless coding, such as that described above with respect to HM and HEVC, rather than coding an index of set of SAO offset values in the codebook. In this example, video encoder 20 may determine whether the explicitly encoded SAO offset values provide for a better rate-distortion performance than encoding an index into the SAO codebook. Video encoder 20, in this example, may signal either the explicitly encoded SAO offset values or signal the index into the SAO codebook based on a rate-distortion optimization.

Additionally, when this determination is made with respect to explicitly encoded SAO offset values and codebook coded offset values, video encoder 20 may, in response to determining that the codebook coded SAO offset values are not more efficiently encoded than explicitly encoded SAO offset values, signal a bit in a bitstream to indicate that the encoded SAO offset values have been explicitly encoded. Moreover, video encoder 20 may signal the explicitly encoded SAO offset values in the bitstream following the above noted bit.

In this manner, the techniques may generally enable more efficient encoding of SAO offset values. Generally, the techniques may define a codebook for SAO with one of the following options:

Option 1: Use a pre-defined codebook of offset values within a decoder/encoder with a size N;

Option 2: Signal a codebook of size N using one of Slice Data/Slice Header/APS/PPS/SPS. Such a codebook may be referenced and/or reused in one or more of the following situations:

Within the same layer (e.g., codebooks from one frame/partition/LCU can be used to predict a codebook for other frame/partition/LCU's offset)

Between different layers in scalable video coding (SVC) (e.g., codebooks from the base layer can be reused or used to predict a codebook for enhancement layers)

Between different views in multi-view video coding (MVC) (e.g., codebooks from one view can be reused or used to predict a codebook for other views)

Option 3: Use option 1 with the possibility of overriding option 1 with option 2; and Option 4: option 1 with the possibility of adding additional sets of offset values to the codebook with the signaling process of option 2.

Option 1 refers to an example where the video encoder and video decoder store a pre-defined, rather than adaptively determined, codebook for storing SAO offset values of size N. That is, the codebook may store N different sets of SAO offset values. For example, for edge type SAO offset, each entry in the codebook may include four offset values. For band type SAO offset, each entry in the codebook may include sixteen offset values.

In one example, there may be a separate codebook for each edge offset type or band offset type. In another example, there may be a single codebook that contains all of the SAO offset values combinations for every SAO type (i.e., each edge type and each band type). Video encoder 20, based on the determined SAO offset type, would select one of the corresponding sets of offset values from the codebook to perform SAO during the encoding process. This determination may be based on a rate-distortion optimization. Video encoder 20 would then signal an index into the codebook into the encoded video bitstream to indicate which set of offset values was used. In the example, where multiple codebooks are used per SAO type, video encoder 20 may also signal one or more bits to indicate the specific codebook being used. Video decoder 30 would then access the offset values in the codebooks stored at the video decoder in accordance with the signaled bits.

Option 2 refers to the above example where the video encoder adaptively determines the codebook and signals this codebook to the video decoder via slice data, a slice header, an APS, a PPS or an SPS. In some examples, the codebook is referenced by multiple different frames, partitions, largest coding units (LCUs). That is, a codebook signaled for use in decoding a first frame, partition (e.g., slice) and/or LCU may be referenced by a second, different frame, partition and/or LCU. Likewise, this aspect of the techniques where multiple frames, partition and/or LCUs may reference the same codebook may be extended to accommodate scalable video coding (SVC) and/or multi-view video coding (MVC).

An example of SVC is the SVC process described in annex G of the H.264/AVC standard, which is hereby incorporated by reference in its entirety. SVC may be developed for, and applied, to other coding standards, such as HEVC. In SVC, one or more enhancement layers may be coded to augment a base layer, often to increase spatial or temporal resolutions at which the video data may be displayed. That is, the base layer may represent video data at a first low spatial or temporal resolution. Additional enhancement layers may augment the base layer to increase the spatial or temporal resolutions in comparison to the base layer. SVC may generally enable forward compatibility for older hardware in that the same bitstream can be consumed by basic video decoders that are capable of decoding a low resolution subset of the bitstream (e.g., the base layer) while more advanced video decoders may be able to decode the base layer in conjunction with additional layers to provide higher resolution video data. Option 2 may be implemented with respect to SVC to enable codebooks to be referenced by multiple layers. For example, codebooks from the base layer can be used to predict codebooks for use in one or more enhancement layers (e.g., differential prediction). In another example, the codebook used for the base layer may simply be reused for one or more enhancement layers.

Multiview Video Coding (MVC) is a video coding process for coding multiple views of video data. Like SVC, an example of an MVC process is defined as an annex to H.264/AVC. More specifically, an MVC process is described in annex H of the H.264/AVC standard, which is hereby incorporated by reference in its entirety. MVC may be developed for, and applied, to other coding standards, such as HEVC. In MVC, each view corresponds to a different perspective, or angle, at which corresponding video data of a common scene was captured. MVC provides for inter-view prediction (meaning prediction between two different views) and intra-view prediction (meaning prediction within the same view). Option 2 may be implemented with respect to MVC to enable codebooks to be referenced by multiple views. For example, codebooks from one view (e.g., a base view) can be used to predict the codebook to be used in one more different views. In another example, the codebook used for the base view may simply be reused for one or more other views.

Option 3 refers to an example combination of option 1 and option 2, where the video encoder and video decoder store a pre-defined codebook that can be replaced on a selective basis by a codebook adaptively determined and signaled by the video encoder. Option 4 refers to a combination of option 1 and option 2, where the video encoder and video decoder store a pre-defined codebook that can be augmented by one or more sets of loop filter parameters (e.g., SAO offset values) determined and signaled by video encoder 20. That is, video encoder 20 may signal a set of loop filter parameters that may be added to a codebook stored at video decoder 30.

One example of codebook storing SAO offset values for edge type SAO is as follows:

(2,1,1,2)
(1,1,1,1)
(1,0,0,1)
(2,0,0,2)
(2,0,1,2)
(2,1,0,2)

In this example codebook, each of the sequence of four numbers identifies a value for offset0, offset1, offset2, and offset3, respectively, for edge type SAO. For example, (2, 1, 1, 2) signifies values of 2, 1, 1 and 2 for offset 0, offset 1, offset2 and offset 3, respectively. The top-most entry (i.e., (2,1,1,2)) is commonly associated with the most frequently identified sequence of values while the second top-most entry (i.e., (1,1,1,1)) is typically the second most frequently employed sequence, and so on. By mapping four values to a single entry in the codebook, the techniques of the disclosure may more efficiently signal the SAO offset values by merely signaling an index in to the codebook, in comparison to explicitly signaling each of the SAO offset values. For example, each of several combinations of the four offset values may be signaled with a respective code that identifies the entry in the codebook.

When signaling offset values using the codebook, as discussed in option 1 above, typically, the video encoder signals an indication (e.g., one or more bits) in the bitstream to indicate that the codebook was used to encode the SAO offset values followed by one more syntax elements that define a specific entry in the codebook (e.g., a set of SAO offset values). The entries in the codebook may typically comprise any code with size N (e.g., a fixed length code with size floor(log 2(N)), unary code or exponential Golomb code). As an example, the indication of use of the codebook may be signaled using a single bit. For example, a first bit may be signaled with value of 1 to indicate use of the codebook, or a value of 0 to indicate that the codebook is not used. In the case where the codebook is used, one or more syntax elements are then signaled to indicate which of the entries in the codebook are used.

When SAO offset values are not coded using the optimized codebook, video encoder 20 may signal a bit in the bitstream indicating that the optimized codebook was not used to code the SAO offset values, followed by explicitly coded SAO offset values. Alternatively, the video encoder may signal the bit indicating that the optimized codebook was not used followed by, for the set of SOA offset values, one or more syntax elements defining an entry in the codebook together with the difference between the value identified in the codebook and actual SAO offset values to be used in the SAO process. Additionally, in some examples, video encoder 20 may signal a scaling factor instead of or in addition to the difference, where the scaling factor may identify a factor to which each of the SOA offset values identified by an optimized code of an optimized codebook may be multiplied.

As one example consistent with the techniques of this disclosure, video encoder 20 and/or video decoder 30 may be configured to code one or more blocks of video data. For example, each of the one or more blocks may correspond to a particular slice of a frame of video data. More generally, however, the one or more blocks may correspond to any of one or more frames of video data, including one or more frames that correspond to one or more so-called "layers" (e.g., in cases where scalable video coding, or SVC, techniques are used), or one or more so-called "views" (e.g., in cases where multi-view coding, of MVC, techniques are used) of one or more coded video sequences (CVS) of video data.

In this example, as part of coding the one or more blocks, video encoder 20 and/or video decoder 30 may be configured to code one or more SAO offset values used by video encoder 20 and/or video decoder 30 to code (e.g., to encode and/or decode) the one or more blocks using a SAO process, as previously described. For example, video decoder 30 may be configured to receive an indication indicating whether or not to use a codebook to perform a loop filtering process, wherein the codebook contains a plurality of entries, wherein each of the entries in the codebook comprises a set of loop filter parameters for the loop filtering process, and wherein the codebook is applicable for one or more blocks of video data, and perform the loop filtering process for the one or more blocks of video data based on the received indication.

Video decoder 30 may be further configured to receive one or more syntax elements defining a particular entry in the codebook, retrieve the particular entry of loop filter parameters from the codebook based on the received one or more syntax elements, and perform the loop filtering process for the one or more blocks of video data based on the received indication and the retrieved loop filter parameters. In one example, the loop filtering process is an adaptive loop filter ALF, and the loop filters parameters comprise ALF coefficients. In another example, the loop filtering process is a sample adaptive offset (SAO) filter, and the loop filter parameters comprise SAO offset values.

Likewise, video encoder 20 may be configured to determine a particular set of loop filter parameters for use in a loop filtering process, signal an indication indicating whether or not the particular set of loop filter parameter are stored in a codebook, wherein the codebook contains a plurality of entries, wherein each of the entries in the codebook comprises a set of loop filter parameters for the loop filtering process, and wherein the codebook is applicable for one or more blocks of video data, and perform the loop filtering process for the one or more blocks of video data based on the particular set of loop filter parameters. Video encoder 20 may be further configured to signal one or more syntax elements defining the entry for the particular set of loop filter parameters in the codebook.

In this manner, by enabling video encoder 20 and/or video decoder 30 to store the codebook defining the plurality of codes and to code the SAO offset values in accordance with the codebook (i.e., by specifying the SAO offset values using one of the plurality of codes defined by the codebook), the techniques of this disclosure may enable video encoder 20 and/or video decoder 30 to code the SAO offset values using less information (e.g., fewer bits of data) compared to other techniques used to code similar data. As one example, by enabling video encoder 20 and/or video decoder 30 to code the SAO offset values in the manner described above, the disclosed techniques may reduce the number of bits signaled in a bitstream (e.g. from video encoder 20 to video decoder 30 and/or storage device 24) relative to techniques that include directly coding the SAO offset values.

Additionally, the above-described techniques may also reduce the complexity of video encoder 20 and/or video decoder 30. As one example, the techniques of this disclosure may simplify processing and/or storage resources of one or more of video encoder 20 and video decoder 30, or reduce the usage thereof. Specifically, by storing the codebook, and by coding the SAO offset values using one of the plurality of entries defined by the codebook, the disclosed techniques may, in some cases, enable video encoder 20 and/or video decoder 30 to process and/or store less information than when coding the SAO offset values directly. For example, as explained in greater detail below, the one of the plurality of codes defined by the codebook and used to code the SAO offset values may, in some cases, be represented using less information (e.g., fewer bits of data) than the SAO offset values themselves.

In this manner, there may be a relative reduction in complexity of one or more of video encoder 20 and video decoder 30 when coding video data (e.g., one or more blocks of video data and associated one or more SAO offset values), and/or a relative bit savings for a coded bitstream that includes the coded video data, when using the techniques of this disclosure.

Video encoder 20 and video decoder 30 each may be implemented as any of a variety of suitable encoder or decoder circuitry, as applicable, such as one or more microprocessors, DSPs, ASICs, FPGAs, discrete logic circuitry, software, hardware, firmware, or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit (IC), a microprocessor, and/or a wireless communication device, such as a cellular telephone.

FIG. 2 is a block diagram that illustrates an example of a video encoder that may perform the techniques for coding SAO offset values in a video coding process, consistent with the techniques of this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes mode select unit 40, motion estimation unit 42, motion compensation unit 44, intra-prediction module 46, reference frame memory 64, summer 50, transform module 52, quantization unit 54, and entropy encoding unit 56. For video block reconstruction, video encoder 20 also includes inverse quantization unit 58, inverse transform module 60, summer 62, and loop filter unit 66. A deblocking filter may also be included to filter block boundaries to remove blockiness artifacts from reconstructed video. Additionally, as described in greater detail below, loop filter unit 66 may perform SAO and/or adaptive loop filter processes in accordance with the techniques of this disclosure, such as ALF and/or deblocking. In any case, the filtered reconstructed video block is then stored in the reference frame memory 64.

As shown in FIG. 2, video encoder 20 receives a current video block within a video slice to be encoded. The slice may be divided into multiple video blocks. Mode select unit 40 may select one of the coding modes, intra- or inter-, for the current video block based on error results. If the intra- or inter- modes are selected, mode select unit 40 provides the resulting intra- or inter-coded block to summer 50 to generate residual block data and to summer 62 to reconstruct the encoded block for use as a reference picture. Loop filter unit 66 may then perform SAO and/or adaptive loop filter processes in accordance with the techniques described above.

The filtered reconstructed video block is then stored in the reference frame memory 64. Intra-prediction module 46 performs intra-predictive coding of the current video block relative to one or more neighboring blocks in the same frame or slice as the current block to be coded to provide spatial compression. Motion estimation unit 42 and motion compensation unit 44 perform inter-predictive coding of the current video block relative to one or more predictive blocks in one or more reference pictures to provide temporal compression.

In the case of inter-coding, motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may calculate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After motion compensation unit 44 generates the predictive block for the current video block, video encoder 20 forms a residual video block by subtracting the predictive block from the current video block. The residual video data in the residual block may be included in one or more TUs and applied to transform module 52. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain.

Transform module 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a QP. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform CAVLC, CABAC, or another entropy encoding technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform module 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference frame memory 64. As previously described, loop filter unit 66 may also perform sample adaptive offset and/or adaptive loop filter processes on the reference block in accordance with the techniques described above. The filtered reconstructed video block is then stored in the reference frame memory 64. The reference block may be used by motion estimation unit 42 and motion compensation unit 44 as a reference block to inter-predict a block in a subsequent video frame or picture.

In some examples, video encoder 20 may be configured to encode one or more blocks of video data during a video coding process e.g., for transmission in a bitstream to video decoder 30 and/or storage device 24. For example, the one or more blocks may be included within one or more slices of a frame of video data, or within slices of multiple frames of video data, as previously described. As one example, as part of encoding the one or more blocks, as one example, loop filter unit 66 of video encoder 20 may be configured to encode one or more SAO offset values, e.g., for transmission in the bitstream along with the encoded one or more blocks to video decoder 30 and/or storage device 24. As also previously described, the one or more SAO offset values may be used by video encoder 20 to encode the one or more blocks, and by video decoder 30 to decoder the one or more blocks.

Loop filter unit 66 may be configured to determine a particular set of loop filter parameters for use in a loop filtering process, signal an indication indicating whether or not the particular set of loop filter parameter are stored in a codebook, wherein the codebook contains a plurality of entries, wherein each of the entries in the codebook comprises a set of loop filter parameters for the loop filtering process, and wherein the codebook is applicable for one or more blocks of video data, and perform the loop filtering process for the one or more blocks of video data based on the particular set of loop filter parameters. Loop filter unit 66 may be further configured to signal one or more syntax elements defining the entry for the particular set of loop filter parameters in the codebook.

In other examples, loop filter unit 66 may be further configured to adaptively determine the codebook. In these examples, entropy encoding unit 56 may be still further configured to signal the adaptively determined codebook in one or more of slice data, a slice header, an APS, an SPS, and a PPS.

FIG. 3 is a block diagram that illustrates an example of a video decoder that may perform the techniques for coding SAO offset values in a video coding process, consistent with the techniques of this disclosure. In the example of FIG. 3, video decoder 30 includes an entropy decoding unit 80, a prediction module 82, an inverse quantization unit 88, an inverse transform module 90, a summer 92, a loop filter unit 94, and a reference frame memory 96. Prediction module 82 includes motion compensation unit 84 and intra-prediction module 86. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. When the represented video blocks in the bitstream include compressed video data, entropy decoding unit 80 of video decoder 30 entropy decodes the bitstream to generate quantized coefficients, motion vectors, and other syntax elements. Entropy decoding unit 80 forwards the motion vectors and other syntax elements to prediction module 82. Video decoder 30 may receive the syntax elements at the video slice level and/or the video block level.

When the video slice is coded as an intra-coded (I) slice, intra-prediction module 86 of prediction module 82 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 84 of prediction module 82 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference frame memory 96.

Motion compensation unit 84 determines prediction information for a video block of the current video slice by parsing the motion vectors and other syntax elements, and uses the prediction information to produce the predictive blocks for the current video block being decoded. For example, motion compensation unit 84 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 84 may also perform interpolation based on interpolation filters. Motion compensation unit 84 may use interpolation filters as used by video encoder 20 during encoding of the video blocks to calculate interpolated values for sub-integer pixels of reference blocks. Motion compensation unit 84 may determine the interpolation filters used by video encoder 20 from the received syntax elements and use the interpolation filters to produce predictive blocks.

Inverse quantization unit 88 inverse quantizes, i.e., dequantizes, the quantized transform coefficients provided in the bitstream and decoded by entropy decoding unit 80. The inverse quantization process may include use of a quantization parameter (QP) calculated by video encoder 20 for each video block in the video slice to determine a degree of quantization and, likewise, a degree of inverse quantization that should be applied. Inverse transform module 90 applies an inverse transform, e.g., an inverse DCT, an inverse integer transform, or a conceptually similar inverse transform process, to the transform coefficients in order to produce residual blocks in the pixel domain.

After motion compensation unit 84 generates the predictive block for the current video block based on the motion vectors and other syntax elements, video decoder 30 forms a decoded video block by summing the residual blocks from inverse transform module 90 with the corresponding predictive blocks generated by motion compensation unit 84. Summer 92 represents the component or components that perform this summation operation. A deblocking filter may be applied to filter the decoded blocks in order to remove blockiness artifacts. Additionally, as described above, loop filter unit 94 may perform SAO and/or adaptive loop filter processes in accordance with the techniques described above. In any case, the decoded video blocks in a given frame or picture are then stored in reference frame memory 96, which stores reference pictures used for subsequent motion compensation. Reference frame memory 96 also stores decoded video for later presentation on a display device, such as display device 28 of FIG. 1.

In some examples, video decoder 30 may be configured to decode one or more blocks of video data during a video coding process e.g., received in a bitstream from video encoder 20 and/or storage device 24. For example, the one or more blocks may be included within one or more slices of a frame of video data, or within slices of multiple frames of video data, as previously described. As one example, as part of decoding the one or more blocks, loop filter unit 94 of video decoder 30 may be configured to decode one or more SAO offset values, e.g., also received in the bitstream along with the encoded one or more blocks from video decoder 30 and/or storage device 24. As also previously described, the one or more SAO offset values may have been previously used by a video encoder (e.g., video encoder 20) to encode the one or more blocks, and may presently be used by video decoder 30 to decode the one or more blocks.

For example, loop filter unit 94 may be configured to receive an indication indicating whether or not to use a codebook to perform a loop filtering process, wherein the codebook contains a plurality of entries, wherein each of the entries in the codebook comprises a set of loop filter parameters for the loop filtering process, and wherein the codebook is applicable for one or more blocks of video data, and perform the loop filtering process for the one or more blocks of video data based on the received indication.

Loop filter unit 94 may be further configured to receive one or more syntax elements defining a particular entry in the codebook, retrieve the particular entry of loop filter parameters from the codebook based on the received one or more syntax elements, and perform the loop filtering process for the one or more blocks of video data based on the received indication and the retrieved loop filter parameters. In one example, the loop filtering process is an adaptive loop filter ALF, and the loop filters parameters comprise ALF coefficients. In another example, the loop filtering process is a sample adaptive offset (SAO) filter, and the loop filter parameters comprise SAO offset values.

Figure 6:
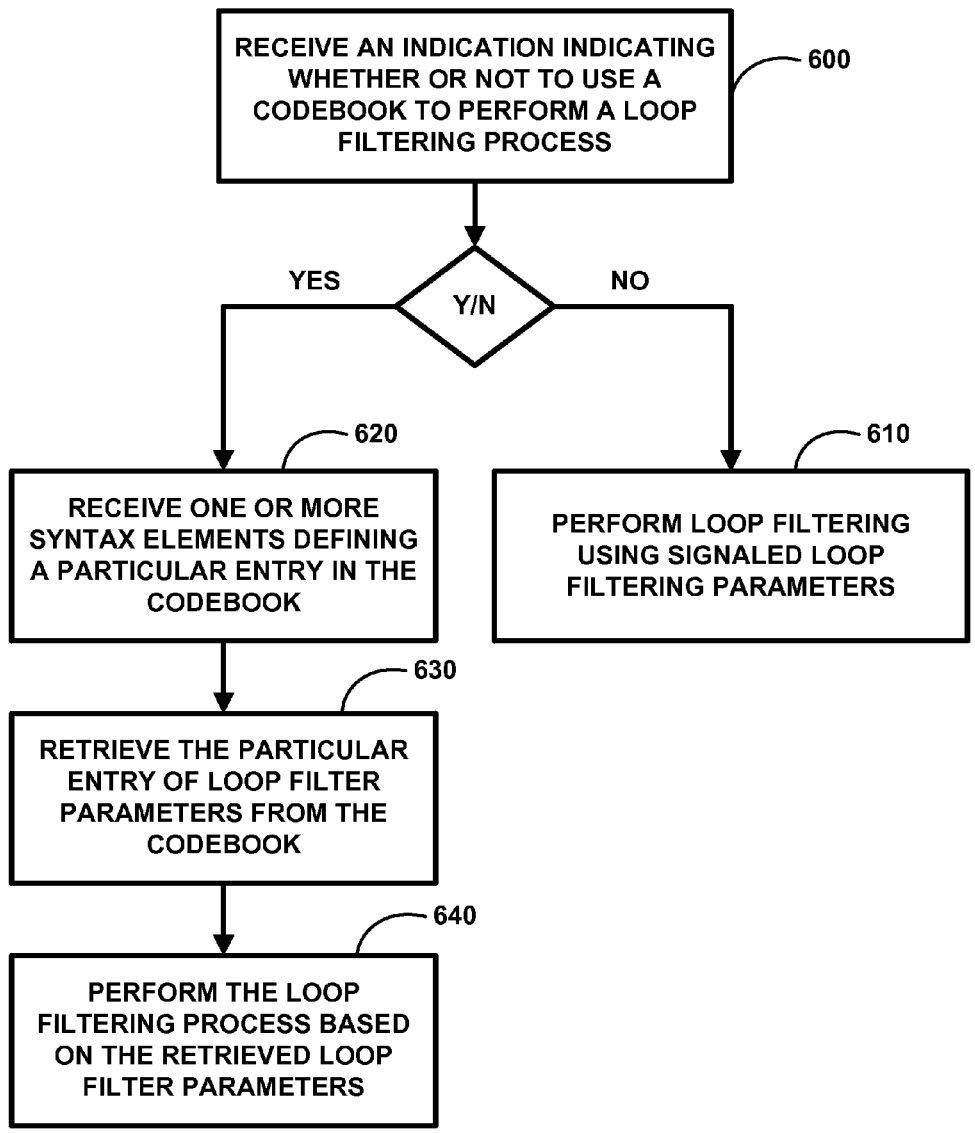
FIGS. 6 and 7 are flowcharts that illustrate example methods of encoding and decoding, respectively, SAO offset values in a video coding process, consistent with the techniques of this disclosure.
Figure 7:
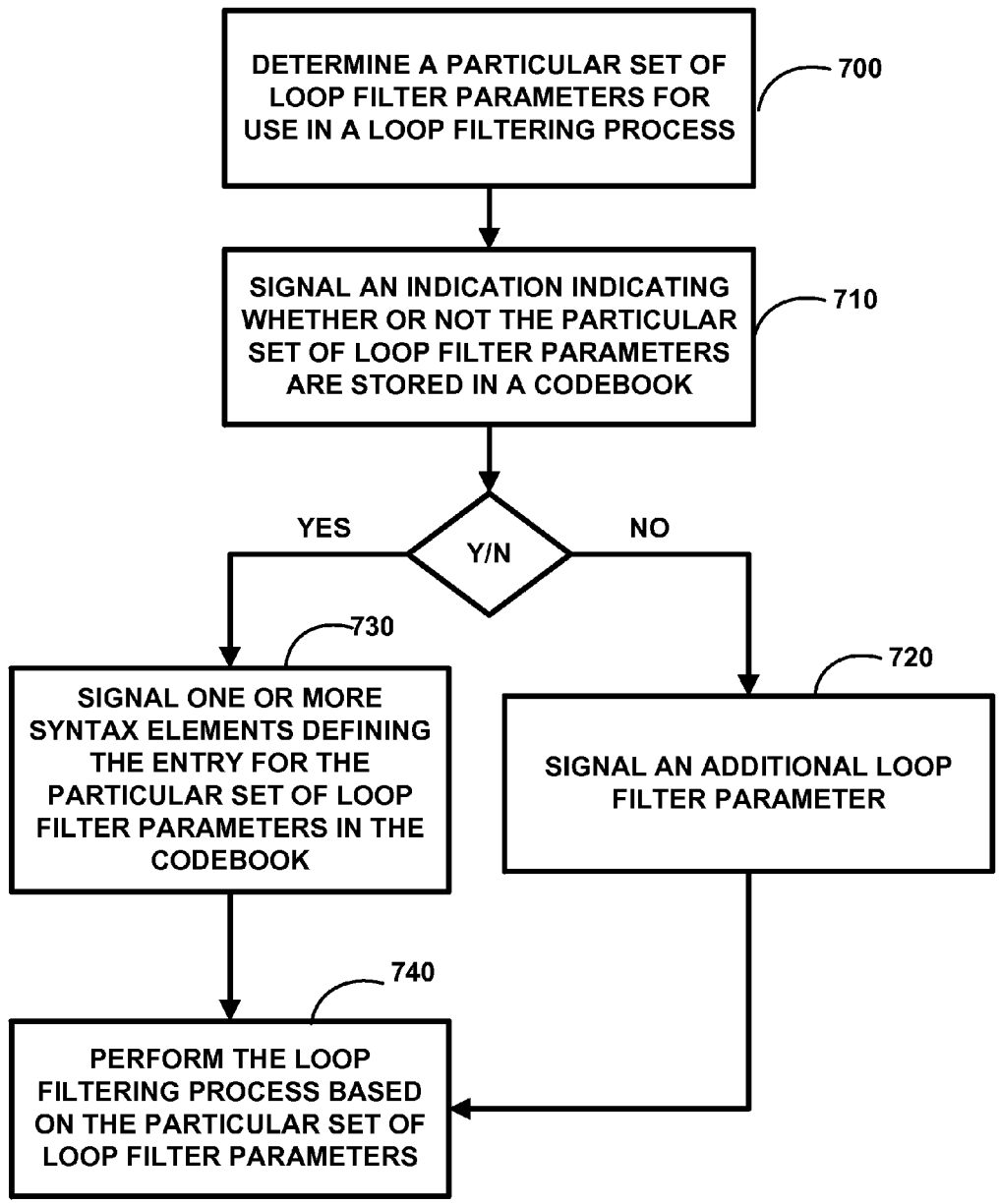

FIGS. 6-7 are flowcharts that illustrate example methods of coding SAO offset values in a video coding process, consistent with the techniques of this disclosure. The techniques of FIGS. 6-7 may generally be performed by any processing unit or processor, whether implemented in hardware, software, firmware, or a combination thereof, and when implemented in software or firmware, corresponding hardware may be provided to execute instructions for the software or firmware.

For purposes of example, the techniques of FIGS. 6-7 are described with respect to both video encoder 20 (FIGS. 1 and 2) and video decoder 30 (FIGS. 1 and 3), as well as various components thereof (e.g., loop filter unit 66 and loop filter unit 94), although it should be understood that other devices may be configured to perform similar techniques. That is, video decoder 30 is generally configured to perform a reciprocal method, with respect to entropy coding, to that performed by video encoder 20. Therefore, video encoder 20 and video decoder 30, in this example, are configured to perform similar (albeit reciprocal) coding methods. However, it should be understood that video encoders and/or video decoders may be individually configured to perform particular methods. Moreover, the steps illustrated in FIGS. 6-7 may be performed in a different order or in parallel, and additional steps may be added and certain steps omitted, without departing from the techniques of this disclosure.

FIG. 6 is a flowchart of an example decoding method according to the techniques of the disclosure. In one example, video decoder 30 may be configured to receive an indication indicating whether or not to use a codebook to perform a loop filtering process, wherein the codebook contains a plurality of entries, wherein each of the entries in the codebook comprises a set of loop filter parameters for the loop filtering process, and wherein the codebook is applicable for one or more blocks of video data (600). If the indication indicates that a codebook is not to be used, video decoder 30 may be further configured to perform the loop filtering process for the one or more blocks of video data using signaled loop filtering parameters (610). That is, the loop filtering parameters will be signaled to video decoder 30 explicitly, and will not be retrieved from the codebook.

If the indication indicates that a codebook is to be used, video decoder 30 may be further configured to receive one or more syntax elements defining a particular entry in the codebook (620). Video decoder 30 may then retrieve the particular entry of loop filter parameters from the codebook based on the received one or more syntax elements (630), and perform the loop filtering process for the one or more blocks of video data based on the received indication and the retrieved loop filter parameters (640).

In one or more examples above, each of one or more of the plurality of entries defined by the codebook comprises one of a fixed length codeword, a unary codeword, and an Exponential Golomb codeword.

In one example, the above-discussed techniques may be performed when the loop filtering process is an adaptive loop filter ALF. In this example, the loop filters parameters comprise ALF coefficients.

In another example, the above-discussed techniques may be performed when the loop filtering process is a sample adaptive offset (SAO) filter. In this example, the loop filter parameters comprise SAO offset values.

In one or more examples of the disclosure, the indication indicates that the codebook is to be used for performing the SAO filter for the one or more blocks of video data. For example, video decoder 30 may be further configured to receive the indication in one or more of a slice header, an adaptation parameter set (APS), a sequence parameter set (SPS), and a picture parameter set (PPS).

In one example of the disclosure, video decoder 30 stores a pre-defined codebook in a memory. In another example, the codebook is not pre-defined, but instead video decoder 30 receives the codebook in one or more of a slice data, slice header, an APS, an SPS, and a PPS.

This disclosure presents various examples for handling the situation where the indication indicates that the codebook is not to be used for performing the SAO filter for the one or more blocks of video data. In one example, video decoder 30 is further configured to receive an additional loop filter parameter set for use with the one or blocks of video data, and perform the loop filtering processing using the received additional loop filter parameter instead of the codebook. In another example, video decoder 30 is further configured to add the received addition loop filter parameter set as an additional entry to the codebook.

Other examples of the disclosure present techniques for predicting and reusing codebooks between layers and views in SVC and MVC. In one example, the codebook is a first codebook and the first codebook corresponds to the one or more blocks of a video data in a base layer of scalable video data. In one example, video decoder 30 is further configured to predict a second codebook for one or more enhancement layers of video data from the first codebook. In another example, video decoder 30 is configured to reuse the codebook for one or more enhancement layers of video data.

In another example, the codebook is a first codebook and the first codebook corresponds to the one or more blocks of a video data in a base view of multiview video data. In one example, video decoder 30 is further configured to predict a second codebook for one or more additional views of multiview video data from the first codebook. In another example, video decoder 30 is further configured to reuse the codebook for one or more additional views of multiview video data.

FIG. 7 is a flowchart of an example decoding method according to the techniques of the disclosure. In one example, video encoder 20 may be configured to determine a particular set of loop filter parameters for use in a loop filtering process (700), and signal an indication indicating whether or not the particular set of loop filter parameter are stored in a codebook (710). The codebook contains a plurality of entries, wherein each of the entries in the codebook comprises a set of loop filter parameters for the loop filtering process, and wherein the codebook is applicable for one or more blocks of video data.

In the case that the indication indicates that the codebook is not to be used, video encoder 20 may be configured to signal an additional loop filter parameter set for use with the one or blocks of video data (720). In the case that the indication that the codebook is to be used, video encoder 20 may be configured to signal one or more syntax elements defining the entry for the particular set of loop filter parameters in the codebook (730). Video encoder 20 may then perform the loop filtering process for the one or more blocks of video data based on the particular set of loop filter parameters (740).

In one or more examples above, each of one or more of the plurality of entries defined by the codebook comprises one of a fixed length codeword, a unary codeword, and an Exponential Golomb codeword.

In one example, the above-discussed techniques may be performed when the loop filtering process is an adaptive loop filter ALF. In this example, the loop filters parameters comprise ALF coefficients.

In another example, the above-discussed techniques may be performed when the loop filtering process is a sample adaptive offset (SAO) filter. In this example, the loop filter parameters comprise SAO offset values.

In one or more examples of the disclosure, the indication indicates that the codebook is to be used for performing the SAO filter for the one or more blocks of video data. For example, video encoder 20 may be further configured to signal the indication in one or more of a slice header, an adaptation parameter set (APS), a sequence parameter set (SPS), and a picture parameter set (PPS).

In one example of the disclosure, video encoder 20 stores a pre-defined codebook in a memory. In another example, the codebook is not pre-defined, but instead video encoder 20 signals the codebook in one or more of a slice data, slice header, an APS, an SPS, and a PPS.

This disclosure presents various examples for handling the situation where the indication indicates that the codebook is not to be used for performing the SAO filter for the one or more blocks of video data. In one example, video encoder 20 is further configured to signal an additional loop filter parameter set for use with the one or blocks of video data, and perform the loop filtering processing using the signaled additional loop filter parameter instead of the codebook. In another example, video encoder 20 is further configured to add the signaled addition loop filter parameter set as an additional entry to the codebook.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which may correspond to tangible or non-transitory media, such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium, such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient or non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more general purpose microprocessors, DSPs, ASICs, FPGAs, or other equivalent integrated or discrete logic circuitry. Accordingly, the term "processor," as used herein, may refer to any of the foregoing structure or any other structure suitable for implementation of the techniques described in this disclosure. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an IC or a set of ICs (e.g., a chip set). Various components, modules, or units are described in this disclosure to emphasize functional aspects of devices configured to perform the disclosed techniques, but do not necessarily require realization by different hardware components, modules, or units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding loop filter parameters in a video decoding process comprising:
   receiving an indication, in one or more of a slice header, an adaptation parameter set (APS), a sequence parameter set (SPS), or a picture parameter set (PPS), indicating whether or not to use a codebook to perform a loop filtering process, wherein the codebook contains a plurality of entries, wherein each of the entries in the codebook comprises adaptive loop filter (ALF) coefficients or sample adaptive offset (SAO) offset values, and wherein the codebook is applicable for one or more blocks of video data; and
   performing the loop filtering process for the one or more blocks of video data based on the received indication, wherein in the case that the indication indicates that the codebook is to be used for performing the loop filter process for the one or more blocks of video data, the method further comprises performing the loop filtering using the codebook, and in the case that the indication indicates that the codebook is not to be used for performing the loop filtering process for the one or more blocks of video data, the method further comprises:
receiving additional SAO offset values or additional ALF coefficients for use with the one or blocks of video data; and
performing the loop filtering process using the received additional SAO offset values or additional ALF coefficients instead of the codebook.

2. The method of claim 1, further comprising:
receiving one or more syntax elements defining a particular entry in the codebook;
retrieving the particular entry of ALF coefficients or SAO offset values from the codebook based on the received one or more syntax elements; and
performing the loop filtering process for the one or more blocks of video data based on the received indication and the retrieved ALF coefficients or SAO offset values.

3. The method of claim 1, wherein the loop filtering process is an adaptive loop filter ALF, and wherein the entries in the codebook comprise ALF coefficients.

4. The method of claim 1, wherein the loop filtering process is a sample adaptive offset (SAO) filter, and wherein the entries in the codebook comprise SAO offset values.

5. The method of claim 1, further comprising:
receiving the codebook in one or more of a slice data, slice header, an APS, an SPS, and a PPS.

6. The method of claim 1, further comprising:
adding the received additional SAO offset values or additional ALF coefficients as an additional entry to the codebook.

7. The method of claim 1, wherein the codebook is a first codebook and the first codebook corresponds to the one or more blocks of a video data in a base layer of scalable video data, the method further comprising:
predicting a second codebook for one or more enhancement layers of video data from the first codebook.

8. The method of claim 1, wherein the codebook corresponds to the one or more blocks of a video data in a base layer of scalable video data, the method further comprising:
reusing the codebook for one or more enhancement layers of video data.

9. The method of claim 1, wherein the codebook is a first codebook and the first codebook corresponds to the one or more blocks of a video data in a base view of multiview video data, the method further comprising:
predicting a second codebook for one or more additional views of multiview video data from the first codebook.

10. The method of claim 1, wherein the codebook corresponds to the one or more blocks of a video data in a base view of multiview video data, the method further comprising:
reusing the codebook for one or more additional views of multiview video data.

11. The method of claim 1, wherein each of one or more of the plurality of entries defined by the codebook comprises one of:
a fixed length codeword;
a unary codeword; and
an Exponential Golomb codeword.

12. A method of encoding loop filter parameters in a video encoding process comprising:
determining a particular set of adaptive loop filter (ALF) coefficients or sample adaptive offset (SAO) offset values for use in a loop filtering process;
signaling an indication, in one or more of a slice header, an adaptation parameter set (APS), a sequence parameter set (SPS), or a picture parameter set (PPS), indicating whether or not the particular set of ALF coefficients or SAO offset values are stored in a codebook, wherein the codebook contains a plurality of entries, wherein each of the entries in the codebook comprises ALF coefficients or SAO offset values, and wherein the codebook is applicable for one or more blocks of video data;
signaling, in the case that the indication indicates that the particular set of ALF coefficients or SAO offset values are stored in the codebook, one or more syntax elements defining an entry for the particular set of ALF coefficients or SAO offset values in the codebook;
signaling, in the case that the indication indicates that the particular set of ALF coefficients or SAO offset values are not stored in the codebook, additional ALF coefficients or additional SAO offset values for use with the one or blocks of video data; and
performing the loop filtering process for the one or more blocks of video data based on the particular set of ALF coefficients or SAO offset values.

13. The method of claim 12, wherein the loop filtering process is an adaptive loop filter ALF, and wherein the entries in the codebook comprise ALF coefficients.

14. The method of claim 12, wherein the loop filtering process is a sample adaptive offset (SAO) filter, and wherein the entries in the codebook comprise SAO offset values.

15. The method of claim 12, further comprising:
signaling the codebook in one or more of a slice data, slice header, an APS, an SPS, and a PPS.

16. The method of claim 12, further comprising:
adding the additional SAO offset values or the additional ALF coefficients as an additional entry to the codebook.

17. The method of claim 12, wherein the codebook is a first codebook and the first codebook corresponds to the one or more blocks of a video data in a base layer of scalable video data, the method further comprising:
predicting a second codebook for one or more enhancement layers of video data from the first codebook.

18. The method of claim 12, wherein the codebook corresponds to the one or more blocks of a video data in a base layer of scalable video data, the method further comprising:
reusing the codebook for one or more enhancement layers of video data.

19. The method of claim 12, wherein the codebook is a first codebook and the first codebook corresponds to the one or more blocks of a video data in a base view of multiview video data, the method further comprising:
predicting a second codebook for one or more additional views of multiview video data from the first codebook.

20. The method of claim 12, wherein the codebook corresponds to the one or more blocks of a video data in a base view of multiview video data, the method further comprising:
reusing the codebook for one or more additional views of multiview video data.

21. The method of claim 12, wherein each of one or more of the plurality of entries defined by the codebook comprises one of:
a fixed length codeword;
a unary codeword; and
an Exponential Golomb codeword.

22. An apparatus configured to decode loop filter parameters in a video decoding process, the apparatus comprising:

a memory configured to store a codebook; and
a video decoder configured to:
receive an indication, in one or more of a slice header, an adaptation parameter set (APS), a sequence parameter set (SPS), and a picture parameter set (PPS), indicating whether or not to use the codebook to perform a loop filtering process, wherein the codebook contains a plurality of entries, wherein each of the entries in the codebook comprises adaptive loop filter (ALF) coefficients or sample adaptive offset (SAO) offset values, and wherein the codebook is applicable for one or more blocks of video data; and
perform the loop filtering process for the one or more blocks of video data based on the received indication,
wherein in the case that the indication indicates that the codebook is to be used for performing the loop filter process for the one or more blocks of video data, the video decoder is further configured to perform the loop filtering using the codebook, and
wherein in the case that the indication indicates that the codebook is not to be used for performing the loop filtering process for the one or more blocks of video data, the video decoder is further configured to:
receive additional SAO offset values or additional ALF coefficients for use with the one or blocks of video data; and
perform the loop filtering process using the received additional SAO offset values or additional ALF coefficients instead of the codebook.

23. The apparatus of claim 22, wherein the video decoder is further configured to:
receive one or more syntax elements defining a particular entry in the codebook;
retrieve the particular entry of ALF coefficients or SAO offset values from the codebook based on the received one or more syntax elements; and
perform the loop filtering process for the one or more blocks of video data based on the received indication and the retrieved ALF coefficients or SAO offset values.

24. The apparatus of claim 22, wherein the loop filtering process is an adaptive loop filter ALF, and wherein the entries in the codebook comprise ALF coefficients.

25. The apparatus of claim 22, wherein the loop filtering process is a sample adaptive offset (SAO) filter, and wherein the entries in the codebook comprise SAO offset values.

26. The apparatus of claim 22, wherein the video decoder is further configured to:
receive the codebook in one or more of a slice data, slice header, an APS, an SPS, and a PPS.

27. The apparatus of claim 22, wherein the video decoder is further configured to:
add the received additional SAO offset values or additional ALF coefficients as an additional entry to the codebook.

28. The apparatus of claim 22, wherein the codebook is a first codebook and the first codebook corresponds to the one or more blocks of a video data in a base layer of scalable video data, and wherein the video decoder is further configured to:
predict a second codebook for one or more enhancement layers of video data from the first codebook.

29. The apparatus of claim 22, wherein the codebook corresponds to the one or more blocks of a video data in a base layer of scalable video data, and wherein the video decoder is further configured to:
reuse the codebook for one or more enhancement layers of video data.

30. The apparatus of claim 22, wherein the codebook is a first codebook and the first codebook corresponds to the one or more blocks of a video data in a base view of multiview video data, and wherein the video decoder is further configured to:
predict a second codebook for one or more additional views of multiview video data from the first codebook.

31. The apparatus of claim 22, wherein the codebook corresponds to the one or more blocks of a video data in a base view of multiview video data, and wherein the video decoder is further configured to:
reuse the codebook for one or more additional views of multiview video data.

32. The apparatus of claim 22, wherein each of one or more of the plurality of entries defined by the codebook comprises one of:
a fixed length codeword;
a unary codeword; and
an Exponential Golomb codeword.

33. An apparatus configured to encode loop filter parameters in a video encoding process, the apparatus comprising:
a memory configured to store a codebook; and
a video encoder configured to:
determine a particular set of adaptive loop filter (ALF) coefficients or sample adaptive offset (SAO) offset values for use in a loop filtering process;
signal an indication, in one or more of a slice header, an adaptation parameter set (APS), a sequence parameter set (SPS), or a picture parameter set (PPS), indicating whether or not the particular set of ALF coefficients or SAO offset values are stored in the codebook, wherein the codebook contains a plurality of entries, wherein each of the entries in the codebook comprises ALF coefficients or SAO offset values, and wherein the codebook is applicable for one or more blocks of video data;
signal, in the case that the indication indicates that the particular set of ALF coefficients or SAO offset values are stored in the codebook, one or more syntax elements defining an entry for the particular set of ALF coefficients or SAO offset values in the codebook;
signal, in the case that the indication indicates that the particular set of ALF coefficients or SAO offset values are not stored in the codebook, additional ALF coefficients or additional SAO offset values for use with the one or blocks of video data; and
perform the loop filtering process for the one or more blocks of video data based on the particular set of ALF coefficients or SAO offset values.

34. The apparatus of claim 33, wherein the loop filtering process is an adaptive loop filter ALF, and wherein the entries in the codebook comprise ALF coefficients.

35. The apparatus of claim 33, wherein the loop filtering process is a sample adaptive offset (SAO) filter, and wherein the entries in the codebook comprise SAO offset values.

36. The apparatus of claim 33, wherein the video encoder is further configured to:
signal the codebook in one or more of a slice data, slice header, an APS, an SPS, and a PPS.

37. The apparatus of claim 33, wherein the video encoder is further configured to:
add the additional SAO offset values or the additional ALF coefficients as an additional entry to the codebook.

38. The apparatus of claim 33, wherein the codebook is a first codebook and the first codebook corresponds to the one or more blocks of a video data in a base layer of scalable video data, and wherein the video encoder is further configured to:
    predict a second codebook for one or more enhancement layers of video data from the first codebook.

39. The apparatus of claim 33, wherein the codebook corresponds to the one or more blocks of a video data in a base layer of scalable video data, and wherein the video encoder is further configured to:
    reuse the codebook for one or more enhancement layers of video data.

40. The apparatus of claim 33, wherein the codebook is a first codebook and the first codebook corresponds to the one or more blocks of a video data in a base view of multiview video data, and wherein the video encoder is further configured to:
    predict a second codebook for one or more additional views of multiview video data from the first codebook.

41. The apparatus of claim 33, wherein the codebook corresponds to the one or more blocks of a video data in a base view of multiview video data, and wherein the video encoder is further configured to:
    reuse the codebook for one or more additional views of multiview video data.

42. The apparatus of claim 33, wherein each of one or more of the plurality of entries defined by the codebook comprises one of:
    a fixed length codeword;
    a unary codeword; and
    an Exponential Golomb codeword.

43. An apparatus configured to decode loop filter parameters in a video decoding process, the apparatus comprising:
    means for receiving, in one or more of a slice header, an adaptation parameter set (APS), a sequence parameter set (SPS), or a picture parameter set (PPS), an indication indicating whether or not to use a codebook to perform a loop filtering process, wherein the codebook contains a plurality of entries, wherein each of the entries in the codebook comprises adaptive loop filter (ALF) coefficients or sample adaptive offset (SAO) offset values, and wherein the codebook is applicable for one or more blocks of video data; and
    means for performing the loop filtering process for the one or more blocks of video data based on the received indication, including:
        means for performing the loop filtering using the codebook in the case that the indication indicates that the codebook is to be used for performing the loop filter process for the one or more blocks of video data;
        means for receiving additional SAO offset values or additional ALF coefficients for use with the one or blocks of video data in the case that the indication indicates that the codebook is not to be used for performing the loop filtering process for the one or more blocks of video data; and
        means for performing the loop filtering process using the received additional SAO offset values or additional ALF coefficients instead of the codebook.

44. An apparatus configured to encode loop filter parameters in a video encoding process, the apparatus comprising:
    means for determining a particular set of adaptive loop filter (ALF) coefficients or sample adaptive offset (SAO) offset values for use in a loop filtering process;
    means for signaling, in one or more of a slice header, an adaptation parameter set (APS), a sequence parameter set (SPS), or a picture parameter set (PPS), an indication indicating whether or not the particular set of ALF coefficients or SAO offset values are stored in a codebook, wherein the codebook contains a plurality of entries, wherein each of the entries in the codebook comprises ALF coefficients or SAO offset values, and wherein the codebook is applicable for one or more blocks of video data;
    means for signaling one or more syntax elements defining an entry for the particular set of ALF coefficients or SAO offset values in the codebook in the case that the indication indicates that the particular set of ALF coefficients or SAO offset values are stored in the codebook;
    means for signaling additional ALF coefficients or additional SAO offset values for use with the one or blocks of video data in the case that the indication indicates that the particular set of ALF coefficients or SAO offset values are not stored in the codebook; and
    means for performing the loop filtering process for the one or more blocks of video data based on the particular set of ALF coefficients or SAO offset values.

45. A non-transitory computer-readable storage medium storing instructions that, when executed, cause one or more processors of a device configured to decode video data to:
    receive an indication, in one or more of a slice header, an adaptation parameter set (APS), a sequence parameter set (SPS), or a picture parameter set (PPS), indicating whether or not to use a codebook to perform a loop filtering process, wherein the codebook contains a plurality of entries, wherein each of the entries in the codebook comprises adaptive loop filter (ALF) coefficients or sample adaptive offset (SAO) offset values, and wherein the codebook is applicable for one or more blocks of video data; and
    perform the loop filtering process for the one or more blocks of video data based on the received indication,
    wherein in the case that the indication indicates that the codebook is to be used for performing the loop filter process for the one or more blocks of video data, the instructions further cause the one or more processors to perform the loop filtering using the codebook, and
    wherein in the case that the indication indicates that the codebook is not to be used for performing the loop filtering process for the one or more blocks of video data, the instructions further cause the one or more processors to:
    receive additional SAO offset values or additional ALF coefficients for use with the one or blocks of video data; and
    perform the loop filtering process using the received additional SAO offset values or additional ALF coefficients instead of the codebook.

46. A non-transitory computer-readable storage medium storing instructions that, when executed, cause one or more processors of a device configured to encode video data to:
    determine a particular set of adaptive loop filter (ALF) coefficients or sample adaptive offset (SAO) offset values for use in a loop filtering process;
    signal an indication, in one or more of a slice header, an adaptation parameter set (APS), a sequence parameter set (SPS), or a picture parameter set (PPS), indicating whether or not the particular set of ALF coefficients or SAO offset values are stored in a codebook, wherein the codebook contains a plurality of entries, wherein each of the entries in the codebook comprises ALF coefficients or SAO offset values, and wherein the codebook is applicable for one or more blocks of video data;

signal, in the case that the indication indicates that the particular set of ALF coefficients or SAO offset values are stored in the codebook, one or more syntax elements defining an entry for the particular set of ALF coefficients or SAO offset values in the codebook;

signal, in the case that the indication indicates that the particular set of ALF coefficients or SAO offset values are not stored in the codebook, additional ALF coefficients or additional SAO offset values for use with the one or blocks of video data; and perform the loop filtering process for the one or more blocks of video data based on the particular set of ALF coefficients or SAO offset values.

47. The method of claim 1, the method being executable on a wireless communication device, wherein the device comprises:

a memory configured to store the video data;

a processor configured to execute instructions to process the video data stored in the memory; and a receiver configured to receive the video data and the indication.

48. The method of claim 47, wherein the wireless communication device is a cellular telephone and the video data and the indication is received by the receiver and modulated according to a cellular communication standard.

49. The apparatus of claim 22, wherein the apparatus is a wireless communication device, the apparatus further comprising:

a receiver configured to receive the video data and the indication.

50. The apparatus of claim 49, wherein the wireless communication device is a cellular telephone and the video data and the indication is received by the receiver and modulated according to a cellular communication standard.

* * * * *